UNITED STATES PATENT OFFICE 2,640,847

PRODUCTION OF NEUTRAL ESTERS OF THIOLPHOSPHORIC ACID

Gerhard Schrader, Opladen-Bruchhausen, Germany, assignor to Farbenfabriken Bayer, Leverkusen, Germany, a manufacturing and trading organization of Germany No Drawing. Application May 21, 1949, Serial No. 94,721. In Germany May 7, 1949

3 Claims. (Cl. 260—461)

The present invention relates to a new process for the manufacture of neutral esters of thiolphosphoric acid.

Hitherto the neutral esters of thiolphosphoric acid of the formula

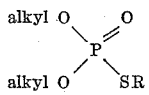

in particular the esters in which alkyl and R of the above formula are methyl, ethyl, propyl and isobutyl, were prepared by reacting salts of thiolphosphoric acid with alkyl halides. In most cases, however, this reaction could successfully be carried through only when the salts of heavy metals, such as silver or lead salts, and as alkyl halide the iodides were used.

It has now been found that the neutral esters of thiolphosphoric acid can easily be prepared when alkyl thiocyanates or substituted alkyl thiocyanates are reacted with alkali salts of dialkyl phosphates, which are technically easily obtainable. The alkyl radicals of the alkyl thiocyanates may belong to the lower or the higher alkyls, such as methyl, ethyl, propyl, butyl, hexyl and dodecyl, and also the ethylene radical may be mentioned. They may be substituted e. g. by aryl, their carbon chain may be interrupted by hetero atoms, in other words they may be substituted in any desired way. The new compounds obtained, when using thiocyanates of the formula R'. S. alk. SCN, R' being alkyl or aryl (see Examples 9 and 10), are claimed in my copending application Serial No. 184,335, filed September 11, 1950, and now Patent No. 2,597,534, patented May 20, 1952.

The reaction is most conveniently carried out in an inert solvent e. g. in benzene or its homologues. With slight heating the desired esters are thus formed while alkali cyanide is split off. Therefore the reaction surprisingly proceeds in the following way:

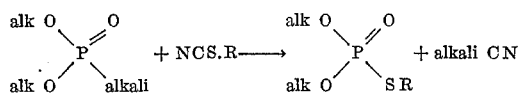

The alkyl radicals may be the same or different.

The following examples illustrate, but do not limit the present invention.

Example 1

70 grams of diethyl phosphite are mixed with 2 cc. of absolute alcohol and diluted with 100 cc. of toluene. 12 grams of sodium are caused to act upon the solution thus obtained. When the sodium has dissolved, 37 grams of methyl thiocyanate are added drop by drop with stirring at 40° C. Stirring is continued at 40° C. for 2 hours. 15 cc. of water are then added to the reaction mixture and the precipitated salts are removed by filtering. 48 grams of dimethyl S-methyl thiolphosphate having a boiling point of 112–113° C. at 14 mm. pressure are obtained. The product is soluble in water.

Example 2

Sodium salt prepared from 12 grams of sodium and 70 grams of diethyl phosphite in benzene as described in Example 1 is heated to 45–50° C. with stirring. At this temperature 44 grams of ethyl thiocyanate are added drop by drop within 10 minutes controlling the temperature by cooling. The reaction mixture is then heated to 55° C. for one hour. After working up as usual 35 grams of diethyl S-ethyl thiolphosphate, boiling at 98° C. at 2 mm. pressure, are obtained. The new product is soluble in water to a limited degree.

Example 3

52 grams of n-propyl thiocyanate are reacted at 40° C. with the sodium salt prepared from 12 grams of sodium and 70 grams of diethyl phosphite in benzene as described in Example 1. The reaction mixture obtained is heated to 55° C. for one hour and then worked up as usual. 40 grams of diethyl S-propyl thiolphosphate, boiling at 103–105° C. at 1 mm. pressure, are obtained. The product is insoluble in water.

Example 4

57.5 grams of isobutyl thiocyanate are reacted at 40° C. with the sodium salt prepared from 12 grams of sodium and 70 grams of diethyl phosphite as described in Example 1. The reaction mixture thus obtained is heated to 55° C. for one hour and subsequently worked up as usual. 74 grams of diethyl S-isobutyl thiolphosphate, boiling at 105° C. at .5 mm. pressure, are obtained. The product is insoluble in water.

Example 5

65 grams of n-hexyl thiocyanate are reacted at 40° C. with the sodium salt prepared from 12 grams of sodium and 70 grams of diethyl phosphite as described in Example 1. The reaction mixture is heated to 55–60° C. for one hour and worked up as usual. 48 grams of diethyl S-hexyl thiolphosphate of the boiling point 125–130° C. at 1 mm. pressure are obtained.

Example 6

115 grams of dodecyl thiocyanate are reacted at 50° C. with the sodium salt prepared from 12 grams of sodium and 70 grams of diethyl phosphite as described in Example 1. The reaction mixture is heated to 55–60° C. for one hour and is then worked up as usual. 60 grams of diethyl S-dodecyl thiolphosphate, having a boiling point of 185–190° C. at .5 mm. pressure, are obtained.

Example 7

The sodium salt prepared from 12 grams of sodium and 70 grams of diethyl phosphite as described in Example 1 is heated to 45° C. At this temperature 76 grams of benzyl thiocyanate are added drop by drop with stirring. The reaction mixture is further heated to 40° C. for half an hour and is then worked up as usual. 70 grams of diethyl S-benzyl thiolphosphate with a boiling point of 165–170° C. at 2 mm. pressure are obtained.

Example 8

29 grams of ethylene dithiocyanate, dissolved in 250 cc. of benzene are added drop by drop to the sodium salt prepared from 10 grams of sodium, 75 cc. of benzene and 56 grams of diethyl phosphite in the presence of 2 cc. of absolute alcohol as described in Example 1. The mixture obtained is heated to 60° C. for one hour and is then worked up in the usual manner. 15 grams of tetraethyl S,S-ethylene di-thiolphosphate with a boiling point of 190° C. at .5 mm. pressure are obtained. The product is insoluble in water.

Example 9

7 grams of sodium are suspended in 150 cc. of toluene. 42 grams of diethyl phosphite are added and the mixture is stirred at 40–50° C., until all sodium is dissolved. With stirring 44 grams of β-ethylmercaptoethyl thiocyanate (boiling at 90° C. at 1 mm. pressure) are added drop by drop at a temperature of 40° C. The mixture is kept for one hour at 50° C. and is then worked up in the usual manner. Thus 28 grams of $(C_2H_5O)_2PO.SC_2H_4.S.C_2H_5$ 

boiling at 137–141° C. at 1 mm. pressure are obtained. The product is a light-yellow oil which is insoluble in water.

Example 10

40 grams of β-methylmercaptoethyl thiocyanate are added drop by drop with stirring at 40° C. to the sodium salt solution obtained according to Example 9. The temperature is kept for one hour at 50° C. and is then worked up in the usual manner. Thus 34 grams of $(C_2H_5O)_2PO.S.C_2H_4.S.CH_3$ boiling at 134–138° C. at 2 mm. pressure are obtained.

The new compounds obtained according to Examples 9 and 10 are distinguished by their exceedingly strong contact insecticidal properties.

I claim:

1. A process for the production of neutral esters of thiolphosphoric acid, which comprises slightly heating a mixture of an alkali salt of a dialkyl phosphite with a compound of the group consisting of alkyl thiocyanates, substituted alkyl thiocyanates and alkylene dithiocyanates.

2. A process as claimed in claim 1 wherein the reaction takes place in the presence of an inert solvent.

3. A process as claimed in claim 1 wherein the reaction takes place at a temperature of from about 40 to about 60° C.

GERHARD SCHRADER. 

References Cited in the file of this patent

UNITED STATES PATENTS

| Number | Name | Date |
| --- | --- | --- |
| 1,982,903 | Clemmensen | Dec. 4, 1934 |
| 2,063,629 | Salzberg et al. | Dec. 8, 1936 |
| 2,167,867 | Benning et al. | Aug. 1, 1939 |
| 2,346,155 | Denison et al. | Apr. 11, 1944 |
| 2,372,244 | Adams et al. | Mar. 27, 1945 |